(12) United States Patent
Ueberschlag et al.

(10) Patent No.: US 10,105,724 B2
(45) Date of Patent: Oct. 23, 2018

(54) DRUM COATER FOR APPLYING A SURFACE LAYER ON BULK-LIKE MATERIALS AND MIXING TOOL TO BE USED IN A DRUM COATER

(71) Applicant: Glatt Maschinen—und Apparatebau AG, Pratteln (CH)

(72) Inventors: Pascal Ueberschlag, Fislis (FR); Juergen Krumm, Schliengen (DE); Jochen Thies, Loerrach (DE)

(73) Assignee: Glatt Maschinen-und Apparatebau AG, Pratteln (CH)

( * ) Notice: Subject to any disclaimer, the term of this patent is extended or adjusted under 35 U.S.C. 154(b) by 0 days.

(21) Appl. No.: 15/457,010

(22) Filed: Mar. 13, 2017

(65) Prior Publication Data
US 2017/0266682 A1  Sep. 21, 2017

(30) Foreign Application Priority Data
Mar. 16, 2016 (DE) ......... 10 2016 003 170

(51) Int. Cl.
*B05B 13/02* (2006.01)
*B01F 9/00* (2006.01)
(Continued)

(52) U.S. Cl.
CPC ......... *B05B 13/0228* (2013.01); *A23G 3/26* (2013.01); *A61J 3/005* (2013.01); *B01F 9/0012* (2013.01);
(Continued)

(58) Field of Classification Search
CPC ... A61J 3/005; A23G 3/20; A23G 3/26; B05B 13/0228; B05B 9/00; B05B 13/025;
(Continued)

(56) References Cited

U.S. PATENT DOCUMENTS 3,258,253 A * 6/1966 Brown, Jr. ............ B01F 9/0007
366/2
4,640,218 A * 2/1987 Motoyama ............ A61J 3/005
118/19
(Continued)

FOREIGN PATENT DOCUMENTS

DE   20 2009 017 787 U1   6/2010
EP      1 050 337 B1   11/2000
(Continued)

OTHER PUBLICATIONS

English Machine Translation of WO2011/013537, Isobe et al, "Pan Coating Device and Baffles for Pan Coating Device" (.Mar. 2, 2011). (Year: 2011).*

*Primary Examiner* — Laura Edwards
(74) *Attorney, Agent, or Firm* — Collard & Roe, P.C.

(57) ABSTRACT

A drum coater for applying a surface layer on bulk-like materials includes a rotatably mounted drum for accommodating bulk-like materials, inlet and outlet openings, at least one spray nozzle for applying the surface material, a drying device for a drum interior, at least first and second radially-offset mixing tools in the drum, the first mixing tool protruding into the drum interior. The at least one second mixing tool has at least one mixing surface such that the first mixing tool is at least partially arranged on the drum inner surface and the at least one second mixing tool has at least one opening on the at least one mixing surface. A mixing tool to be used in a drum coater to gently blend and/or homogenize bulk-like materials has a first mixing surface angled relative to a second mixing surface, at least one mixing surface having at least one opening.

17 Claims, 7 Drawing Sheets

(51) Int. Cl.
*B01F 9/02* (2006.01)
*A61J 3/00* (2006.01)
*A23G 3/26* (2006.01)
*B05B 9/00* (2006.01)
*B05C 11/02* (2006.01)
*B01J 2/00* (2006.01)
*B01J 2/14* (2006.01)

(52) U.S. Cl.
CPC .............. *B01F 9/025* (2013.01); *B01J 2/006* (2013.01); *B01J 2/14* (2013.01); *B05B 9/00* (2013.01); *B05B 13/025* (2013.01); *B05B 13/0257* (2013.01); *B05C 11/023* (2013.01)

(58) Field of Classification Search
CPC ......... B05B 13/0257; B01J 2/14; B01J 2/006; B05C 3/08; B05C 11/023; B01F 9/00; B01F 9/0012; B01F 9/025; B01F 2009/0056; B01F 2009/009; B01F 2009/0092; D06F 58/04; F26B 11/02
USPC ...... 118/19, 20, 417, 418; 366/57, 225, 226, 366/228, 175.1, 187; 426/289, 291, 293, 426/295, 302; 34/599, 602
See application file for complete search history.

(56) References Cited

U.S. PATENT DOCUMENTS

| | | | | |
|---|---|---|---|---|
| 4,799,449 | A | * 1/1989 | Miyata | ..................... A23G 3/26 |
| | | | | 118/19 |
| 5,470,388 | A | * 11/1995 | Goedicke | ................ C23C 14/22 |
| | | | | 118/716 |
| 5,538,195 | A | 7/1996 | Nakazawa et al. | |
| 6,547,882 | B1 | 4/2003 | Bohle | |
| 7,632,355 | B2 | * 12/2009 | Toth | .......................... B22F 1/02 |
| | | | | 118/716 |

FOREIGN PATENT DOCUMENTS

| | | | | |
|---|---|---|---|---|
| EP | 2363202 A1 | * 9/2011 | ............. | A23P 20/18 |
| WO | WO-2011013537 A1 | * 2/2011 | ............... | B01F 9/06 |

* cited by examiner

DRUM COATER FOR APPLYING A SURFACE LAYER ON BULK-LIKE MATERIALS AND MIXING TOOL TO BE USED IN A DRUM COATER

CROSS REFERENCE TO RELATED APPLICATIONS

Applicant claims priority under 35 U.S.C. § 119 of German Application No. 10 2016 003 170.0 filed Mar. 16, 2016, the disclosure of which is incorporated by reference.

BACKGROUND OF THE INVENTION

1. Field of the Invention

The invention is based on a drum coater and a mixing tool.

2. Description of the Related Art

Drum coaters and mixing tools installed therein have been known from the prior art for a long time. Drum coating is the oldest method for coating and finishing active pharmaceutical ingredients and therefore a true classic. In drum coaters, bulk-like materials such as, in particular, tablets, capsules or very large pellets are coated with a surface layer, preferably sugar coatings, paints or even active ingredients. For this purpose, the bulk-like materials are simultaneously sprayed, preferably with a solution or suspension, and dried with a gas, particularly heated air. The bulk-like materials are sprayed in order to produce a surface layer, wherein this surface layer decisively influences the release of active ingredients. The coating furthermore makes it easier for the patient to ingest the products and even an unpleasant taste of the active ingredient can be masked with the coating. Simultaneous drying is required in order to evaporate the solvent from the sprayed-on solution or suspension and thereby produce the desired surface layer on the bulk-like material. Since the bulk-like materials in the drum of the drum coater should be coated with the desired film as uniformly as possible, it is vital to arrange mixing tools such as, for example, paddles or the like in the drum. Due to the design and arrangement of the mixing tools in a drum coater, the bulk-like materials are subjected to increased stress that, if applicable, can lead to partial damage or destruction of the bulk-like material.

Utility model DE 20 2009 017 787 U1 discloses a device for applying a surface layer on cores with a rotatably mounted drum for accommodating the cores, wherein the drum is realized in the form of an elongate cylinder that is larger than the diameter of the drum and has at least one spray nozzles for applying the surface material on the cores, a heating device for the interior of the drum, an inlet opening and an outlet opening, as well as driving elements for the cores that are arranged in the drum and connected to the drum, wherein the driving elements are realized in the form of projections that extend in the longitudinal axis of the drum and protrude into the drum interior. The disadvantages of this device can be seen in that no adequate blending of the cores by the driving elements is ensured in the drum of the device and that the driving elements subject the cores to high mechanical stress, e.g., in the form of friction or the like.

European patent EP 1 050 337 B1 describes a drum coater with forced recirculation of the product, wherein the drum for accommodating the product is rotatably mounted and provided with at least one spray nozzle for applying the surface material on the product, a heating device for drying the product, as well as first and second driving elements, wherein the second driving elements are arranged radially offset to the first driving elements. In this case, the second driving elements transport the product opposite to the first driving elements. The disadvantage of this technical solution can be seen in that the first and second driving elements subject the treated product to be blended to significant mechanical stress, which can lead to damage or even destruction of the product and thereby render the batch being treated in the drum coater unusable.

SUMMARY OF THE INVENTION

The invention is therefore based on the objective of developing an improved arrangement of mixing tools in drum coaters in order to thereby gently blend and/or homogenize bulk-like materials, as well as developing optimally designed mixing tools to be used in the drum coaters.

This objective is attained with a drum coater for applying a surface layer on bulk-like materials and an inventive mixing tool to be used in the inventive drum coater according to the invention.

In contrast to the prior art, the inventive drum coater for applying a surface layer on bulk-like materials with the characteristic features according to one aspect of the invention has the advantage that the first mixing tool is at least partially arranged on the inner surface of the drum and the at least one second mixing tool arranged in the drum has at least one opening on the at least one mixing surface. Due to the at least one opening on the at least one mixing surface of the at least one second mixing tool, blending and/or homogenizing of the bulk-like material is significantly improved in comparison with a non-inventive drum coater. Another significant advantage of the at least one opening on the at least one second mixing tool can be seen in that it reduces the mechanical stress exerted upon the bulk-like material to be blended, particularly due to friction or the like, such that the bulk-like material is very gently treated in the drum of the drum coater and the product quality is in turn immensely improved. Furthermore, the bulk-like material within the loading region (filling level between 10% and 100%) of the drum of the drum coater is blended very well due to the inventive arrangement of the first mixing tools on the drum of the drum coater.

According to an advantageous embodiment of the inventive drum coater, the at least one second mixing tool transports the bulk-like material in the same direction as the at least one first mixing tool. According to the prior art, enhanced blending and/or homogenizing takes place if the first mixing tools transport the bulk-like material opposite to the transport direction of the second mixing tools. However, test results have surprisingly shown that the inventive arrangement of at least one first and at least one second mixing tool, in which the at least one second mixing tool has at least one opening on the at least one mixing surface, also makes it possible to achieve additionally enhanced blending and/or homogenizing of the bulk-like material if it is transported in the same direction.

According to another advantageous embodiment of the inventive drum coater, the at least one first mixing tool is arranged in the drum angular referred to a longitudinal drum axis. This technical design of the at least one first mixing tool has the advantage of optimizing the unloading of the drum in the unloading mode because the at least one mixing tool effectively transports the bulk-like material in the direction of the outlet opening during the rotation of the drum in the unloading mode. This arrangement of the at least one first mixing tool has another positive effect if the first mixing tools arranged in the drum do not continuously extend over the entire length of the longitudinal drum axis.

In this way, additionally enhanced blending and/or homogenizing of the bulk-like material is achieved. According to another enhancement, the first mixing tools, which are arranged in the drum angular to the longitudinal drum axis and do not continuously extend over the entire length of the longitudinal drum axis, at least partially overlap one another. The combination of these arrangements leads to clearly optimized blending and/or homogenizing of the bulk-like material, wherein the mechanical stress exerted upon the bulk-like material is simultaneously reduced and the transport of the bulk-like material in the unloading mode of the drum is improved.

According to another advantageous embodiment of the inventive drum coater, a width of the at least one second mixing tool is greater than a width of the at least one first mixing tool. Such a technical design has the advantage that a second mixing tool, which is wider than the at least one first mixing tool, ensures enhanced blending of greater filling amounts in the drum of the drum coater because the at least one second mixing tool protrudes farther into the drum interior due to its greater width and thereby enhances the blending and/or homogenizing of the bulk-like material.

According to another advantageous embodiment of the inventive drum coater, a pitch of the second mixing tools is shallower than a pitch of the first mixing tools. The shallower pitch ensures that the at least one second mixing tool exerts reduced friction upon the bulk-like material such that the treated bulk-like material to be blended is subjected to reduced mechanical stress and therefore gently blended.

According to another advantageous embodiment of the inventive drum coater, the at least one first mixing tool has at least one opening. Due to the technical design of the at least one mixing tool with at least one opening, the friction acting upon the bulk-like material is additionally minimized such that the stress, particularly the mechanical stress, exerted upon the bulk-like material to be blended is reduced accordingly. In this way, an additionally improved product quality is achieved.

According to another advantageous embodiment of the inventive drum coater, the at least one second mixing tool is detachably arranged in the drum of the drum coater. This has the advantage of making the drum coater extremely flexible. If the at least one second mixing tool is removed, small batches, in which the filling level in the drum lies at only 10%, can surprisingly also be processed with such an arrangement of first mixing tools on the drum of the drum coater. The filling amount usually lies in the range between 30% and 100%. This is a factor that should not be underestimated, particularly for test purposes. The smaller filling amount or lower filling level of bulk-like material can therefore be processed without elaborate conversion measures. In addition, the permanently installed first mixing elements, which also serve as unloading elements in the opposite rotating direction of the drum, are sufficient for uniformly blending such small batches, particularly batches of tablets. The drum coater may furthermore be mounted in a tiltable fashion. The option of mounting the drum coater in a tiltable fashion simplifies the unloading of the bulk-like material located in the drum of the drum coater.

According to another advantageous embodiment of the inventive drum coater, the drum has at least one driving element in the region of the outlet opening. The at least one additional driving element is arranged on the drum of the drum coater in such a way that it improves the collection of the bulk-like material during the unloading process such that the drum can be unloaded even faster.

According to another advantageous embodiment of the inventive drum coater, the drum coater has an outlet for the bulk-like material. An outlet is advantageous because the bulk-like material can thereby be continuously unloaded by the at least one additional driving element arranged in the region of the outlet opening during the unloading process of the drum and, for example, transferred into a storage or collecting container via a flexible line arranged on the outlet. Another advantage can be seen in that a transfer of bulk-like material from the drum into the storage or collecting container can be realized without any of the losses that could potentially occur, for example, if the drum is unloaded with an implement such as a scoop or the like.

According to another advantageous embodiment of the inventive drum coater, the outlet is closed during the rotation of the drum in the mixing mode. This technical design has the advantage that no bulk-like material can be admitted into the outlet in the mixing mode of the drum coater. In this way, the entire bulk-like material is subjected to the mixing and coating process in the mixing mode and it is simultaneously prevented that individual tablets are admitted into the outlet such that the product quality requirements cannot be met. In drum coaters, it is particularly important that the entire bulk-like material has the same residence time.

The advantage of the inventive mixing tool with the characterizing features according to another aspect of the invention, which is used in a drum coater in order to gently blend and/or homogenize bulk-like materials, can be seen in that the mixing tool has at least two mixing surfaces, wherein a first mixing surface is angled relative to a second mixing surface. Due to this advantageous design of the at least two mixing surfaces of the mixing tool, the mechanical stress exerted upon the bulk-like material is reduced and a very high degree of blending is simultaneously achieved such that the product quality of the batch is improved. The advantage of this technical design of the mixing tool can be seen in that the mechanical stress exerted upon the bulk-like material is minimized due to the at least one opening on the mixing surface of the mixing tool such that the product quality is improved.

According to another advantageous embodiment of the inventive mixing tool, the drum coater, in which the mixing tool is used, is a drum coater according to the invention.

Other advantages and advantageous embodiments of the invention can be gathered from the following description, the claims and the drawings.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
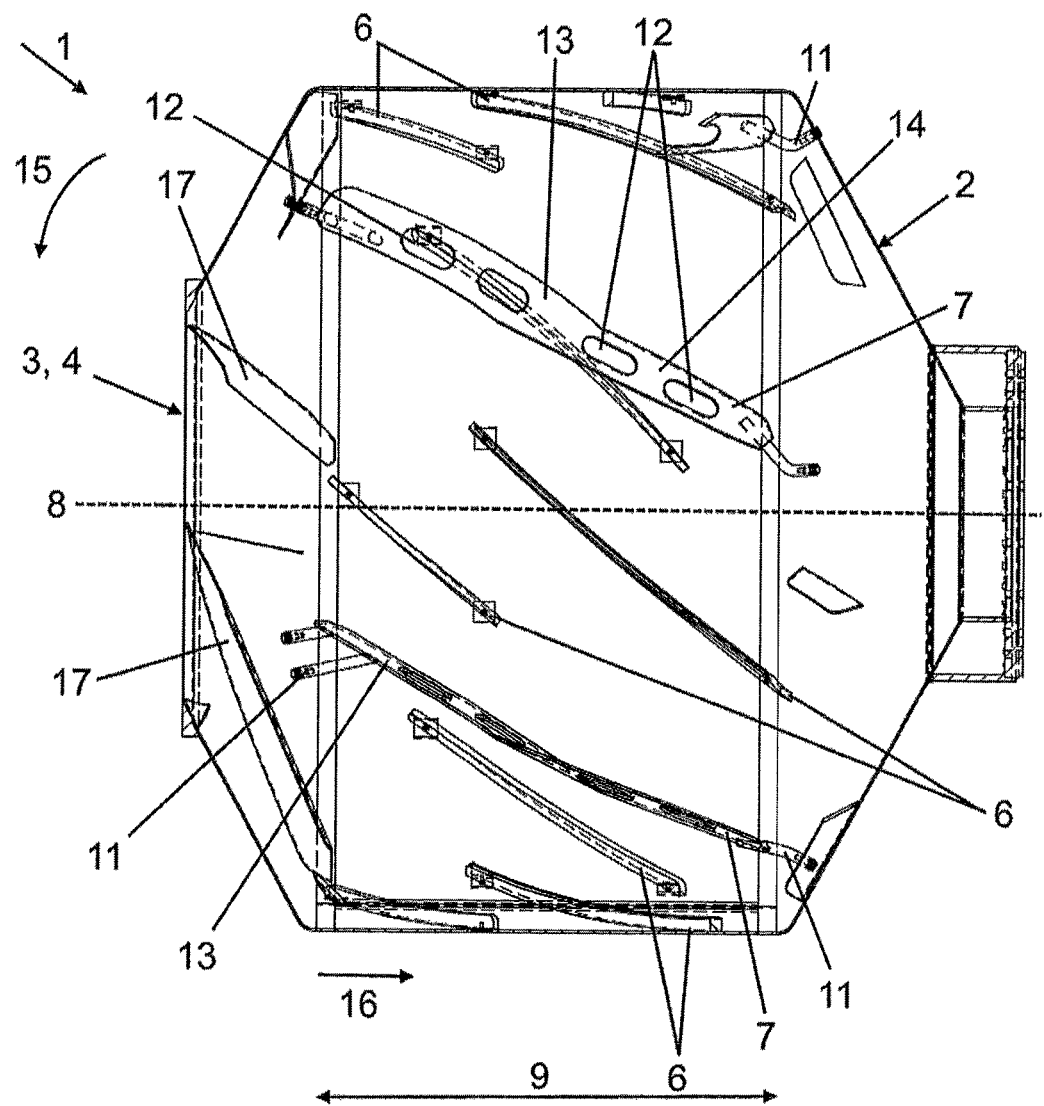
FIG. 1 shows a longitudinal section through the drum of an inventive drum coater.

FIG. 1 shows a longitudinal section through an exemplary embodiment of an inventive drum coater 1, wherein only the drum 2 is illustrated in this figure. The drum coater 1 comprises a rotatably mounted drum 2 with an inlet opening 3 and an outlet opening 4 in order to accommodate (not-shown) bulk-like materials. The inventive drum coater 1 furthermore comprises at least one spray nozzle, which is not illustrated in FIG. 1 and serves for applying a surface coating on the bulk-like materials, as well as a drying device for the drum interior 5, which is likewise not illustrated in FIG. 1. In drum coaters 1, the bulk-like materials, particularly in the form of tablets, capsules or very large pellets, are coated with a layer of surface material, preferably sugar coatings, paints or even active ingredients, in the drum interior 5. For this purpose, the bulk-like materials are simultaneously sprayed, preferably with a solution or suspension, in the drum interior 5 and dried with a fluid, particularly a gas such as heated air. The bulk-like material is sprayed in order to produce a surface layer that decisively influences the release of active ingredients. This so-called coating furthermore makes it easier for the patient to ingest the products and even an unpleasant taste of the active ingredient can be masked with the coating. Simultaneous drying is required in order to evaporate the solvent from the sprayed-on solution or suspension and thereby produce the desired surface layer on the bulk-like material. The bulk-like materials, particularly in the form of tablets, capsules or very large pellets, should be coated with the desired film as uniformly as possible in the drum 2 of the drum coater 1. It is therefore vital to arrange mixing tools 6, 7 such as, for example, paddles or the like in the drum 2. In the inventive drum coater 1, first mixing tools 6 and second mixing tools 7 are arranged in the drum interior 5. The second mixing tools 7 are arranged radially offset to the first mixing tools 6. In the exemplary embodiment of the inventive drum coater 1, the first mixing tools 6 are arranged on the inner surface of the drum 2 angular or oblique referred to a longitudinal drum axis 8. In addition, the first mixing tools 6 do not extend continuously and/or completely over the length 9 of the drum 2. Furthermore, the first mixing tools 6 at least partially overlap over a length 10 referred to the longitudinal drum axis 8. Due to this arrangement of the first mixing tools 6, the bulk-like material, preferably in the form of tablets, capsules or very large pellets, is very well blended without being subjected to high mechanical stress, particularly friction generated between the bulk-like material and the first mixing tools 6. In addition to the first mixing tools 6, second mixing tools 7 are also arranged in the drum 2 of the drum coater 1 and mounted, e.g., on the wall of the drum 2 with fastening means 11, wherein the second mixing tools 7 have openings 12. In the exemplary embodiment, the second mixing tools 7 have two mixing surfaces 13 and 14 that are arranged angular to one another in order to thereby influence the transport and blending of the bulk-like material. It would by all means be conceivable to individually design and arrange second mixing tools 7 in such a way that they have different orientations, as well as a different number of openings 12 and mixing surfaces 13, 14. The openings 12 of the second mixing tools 7 reduce the mechanical stress exerted upon the bulk-like material such that it is very gently treated in the drum 2 of the drum coater 1. In this way, an additionally improved product quality is achieved. The pitch of the mixing surfaces 13 and 14, as well as a different width of the mixing surfaces 13, 14 relative to one another or relative to the first mixing tools 6, additionally influences the quality of the blending and/or homogenizing process. In an embodiment of the inventive drum coater 1, the bulk-like material is very well blended in the mixing mode (rotating direction according to arrow 15), wherein this particularly manifests itself at low filling levels of the drum 2. In this way, excellent blending and/or homogenizing results can be surprisingly achieved over a broad loading range of 10% to 100% of the drum 2. In the exemplary embodiment of the inventive drum coater 1, the first and second mixing tools 6, 7 transport the bulk-like material in a common transport direction 16, namely away from the inlet opening 3 and the outlet opening 4. In order to unload the drum 2, the drum 2 is rotated opposite to the rotating direction in the mixing mode according to the arrow 15 (unloading mode). Due to the arrangement of the first and second mixing tools 6, 7, the bulk-like material is thereby transported in the direction of the outlet opening 4 opposite to the transport direction 16. In addition to the first and second mixing tools 6, 7, driving elements 17, particularly in the form of paddles or the like, are furthermore arranged in the interior of the drum 2 in the region of the outlet opening 4 in order to transport the bulk-like material from the drum 2 into a not-shown outlet such as, for example, an opening with a pipeline connecting piece arranged thereon in the unloading mode. The inventive drum coater 2 furthermore comprises a not-shown device for automatically taking samples of bulk-like material in the drum 2.

Figure 2:
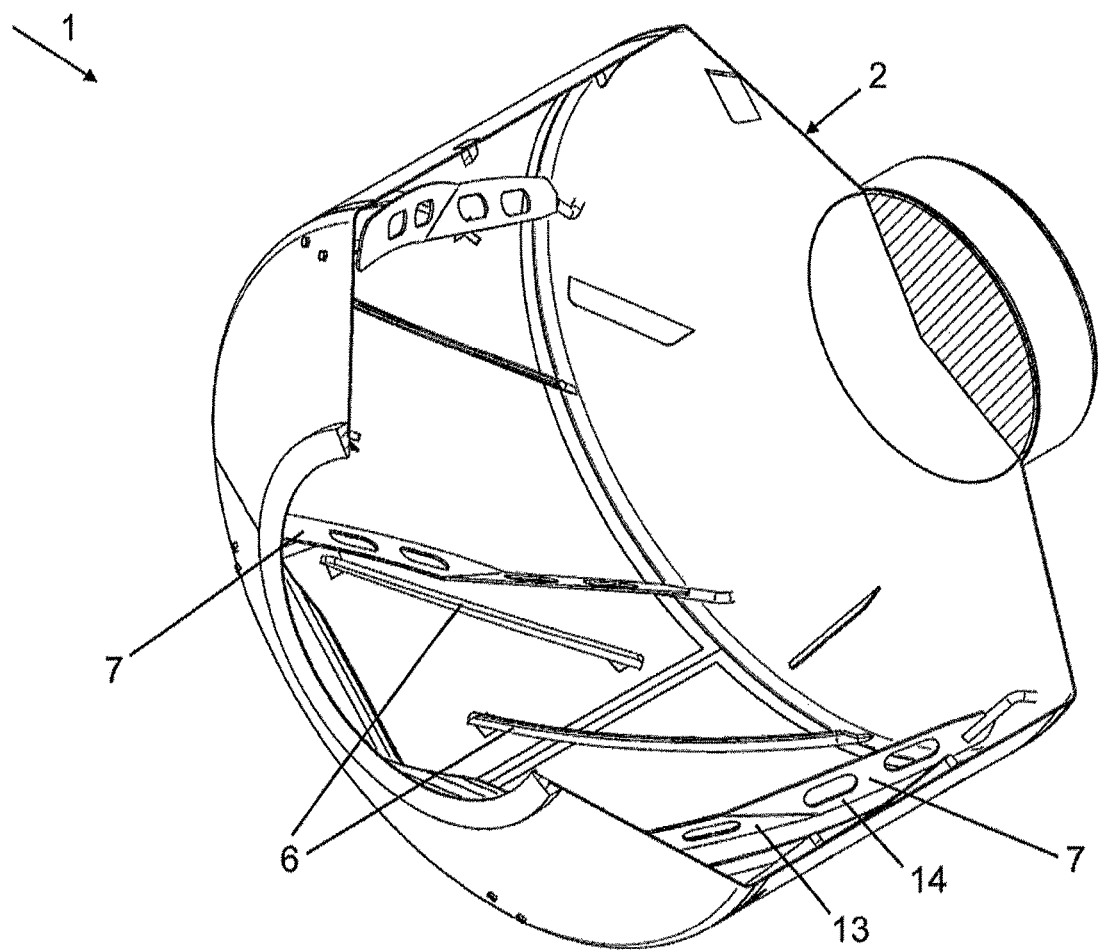
FIG. 2 shows a sectioned perspective view of the drum of the inventive drum coater.

FIG. 2 shows a sectioned perspective view of the drum 2 of the inventive drum coater 1. First driving elements 6 and second driving elements 7 with openings 12 on their mixing surfaces 13 and 14 are illustrated on the inner surface of the drum.

Figure 3:
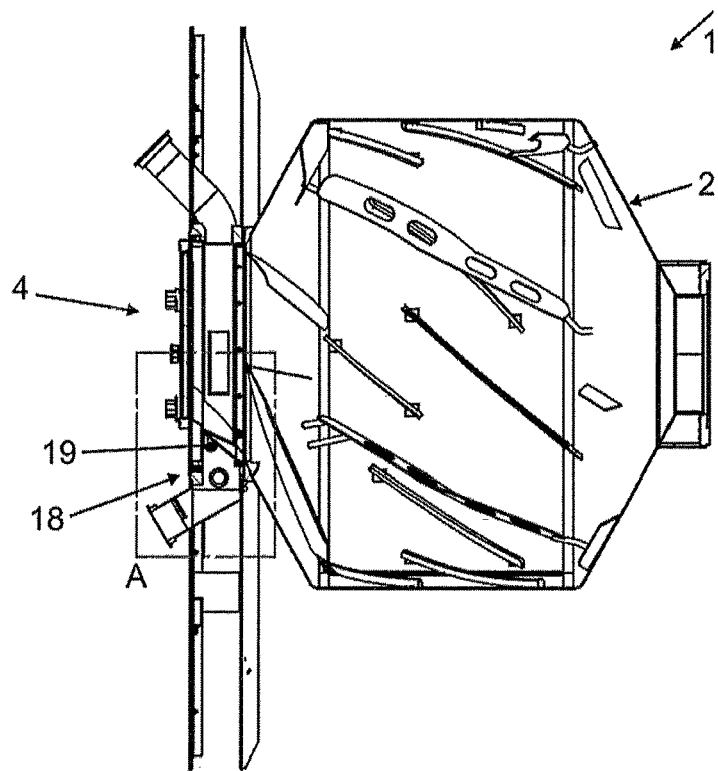
FIG. 3 shows a longitudinal section through an inventive drum coater with an explicit view of the outlet.

FIG. 3 shows a longitudinal section through an inventive drum coater 1 with an explicit view of the outlet 18 in detail A. The outlet 18 has a cover 19 that is at least partially open in the unloading mode and tightly seals the outlet 18 in the mixing mode. In this context, a tight seal means that no bulk-like material, particularly in the form of tablets, capsules or the like, is admitted from the drum 2 into the outlet 18 in the region of the outlet opening 4 in the mixing mode. In this way, the entire bulk-like material has the same residence time in the drum 2 of the drum coater 1 and no untreated or only partially treated material is removed from the drum 2 when it is unloaded.

Figure 4:
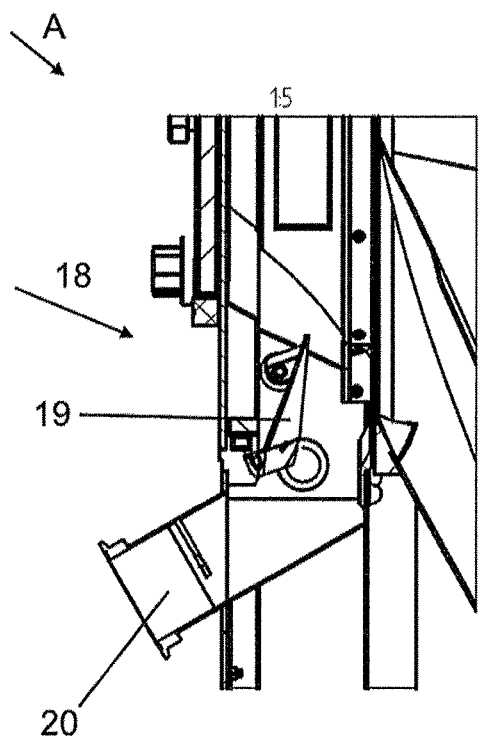
FIG. 4 shows the detail A of FIG. 3 with open cover.

FIG. 4 shows the detail A of FIG. 3, wherein the cover 19 of the outlet 18 is open in this figure. A connecting piece 20 arranged on the outlet 18 is unblocked by the opened cover 19 such that the bulk-like material can be transported, for example, into a not-shown container in the unloading mode of the drum 2 of the drum coater 1 without losing treated material.

Figure 5:
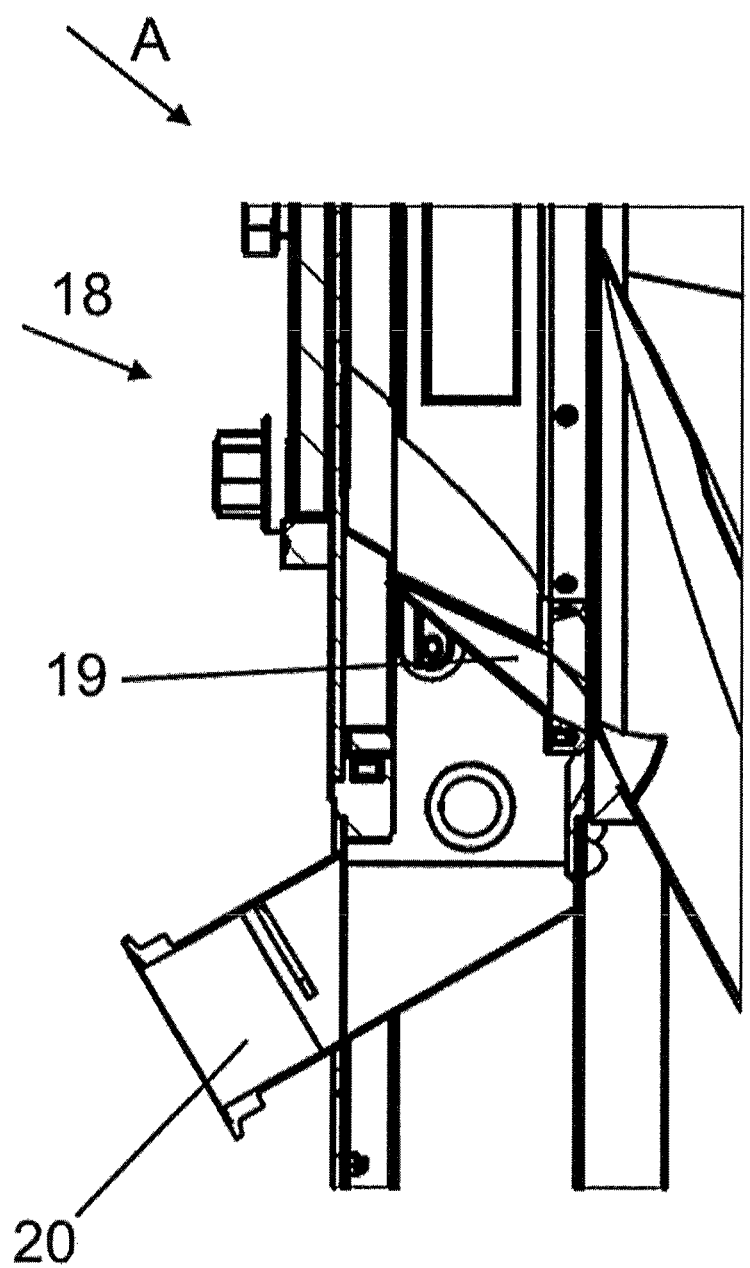
FIG. 5 shows the detail A of FIG. 3 with closed cover.

FIG. 5 shows the detail A of FIG. 3, wherein the cover 19 of the outlet 18 is closed in this figure. The connecting piece 20 arranged on the outlet 18 is blocked by the closed cover 19 such that the bulk-like material remains in the drum 2 of the drum coater 1 in the mixing mode of the drum 2 of the drum coater 1, wherein the entire bulk-like material therefore has the same residence time in the drum and is uniformly treated therein.

Figure 6:
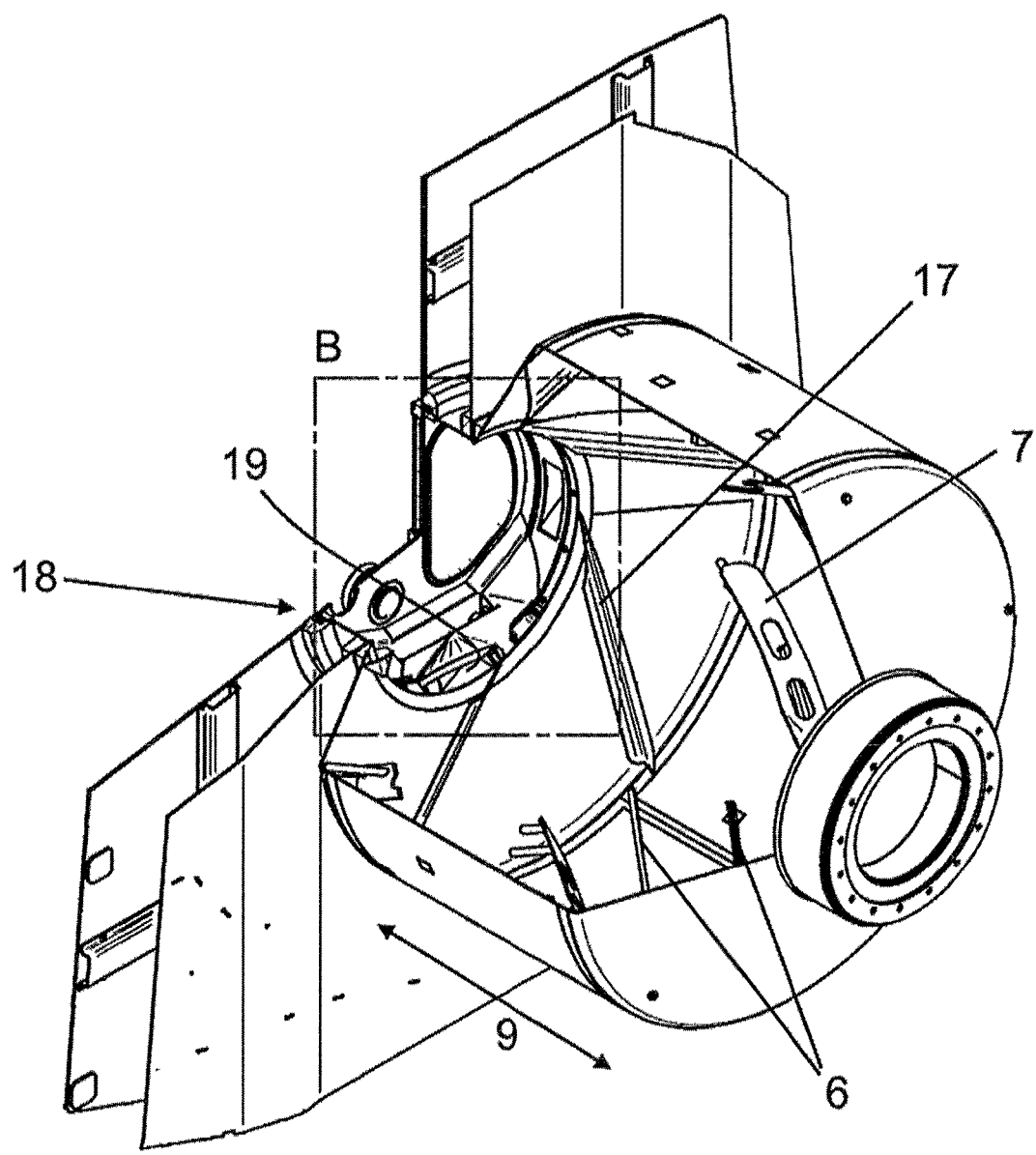
FIG. 6 shows a sectioned perspective view of the drum interior and the outlet of the inventive drum coater.

FIG. 6 shows a perspective view of the drum interior 5 of the drum 2 and the outlet 18 of the inventive drum coater 1. The drum 2 is perforated with openings and has first and second mixing tools 6, 7. A fluid, particularly in the form of a gas such as heated air, is conveyed into the drum interior 5 through the not-shown openings of the drum 2 in order to dry the bulk-like material to be blended or homogenized. The first mixing tools 6 are arranged offset to one another, as well as in a partially overlapping fashion, on the inner surface of the drum 2 and do not continuously extend over the length 9 of the drum 2. The second mixing tools 7 are radially offset to the first mixing tools 6 in the direction of the rotational axis of the drum 2. The blending and/or homogenizing of the bulk-like material is thereby significantly enhanced in comparison with an arrangement, in which only first mixing tools 6 are provided in the drum interior 5. In addition, a driving element 17 is arranged in the region of the outlet opening 4 in order to simplify the unloading of the drum 2. In the unloading mode, the driving element 17 transports bulk-like material into the outlet 18 in the region of the outlet opening 4 of the drum coater 1 and thereby ensures an optimized unloading process. The detail B of the outlet 18 is illustrated in the following FIGS. 7 and 8.

Figure 7:
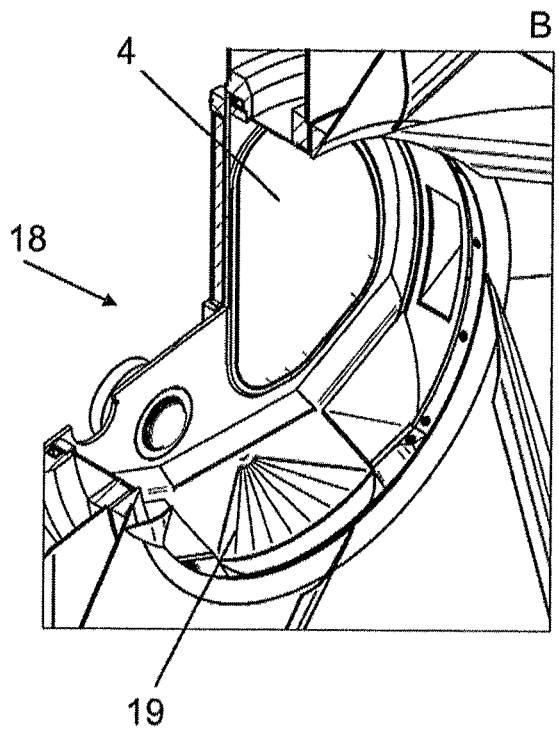
FIG. 7 shows the detail B of the perspective view of the outlet of the inventive drum coater with closed cover.
Figure 8:
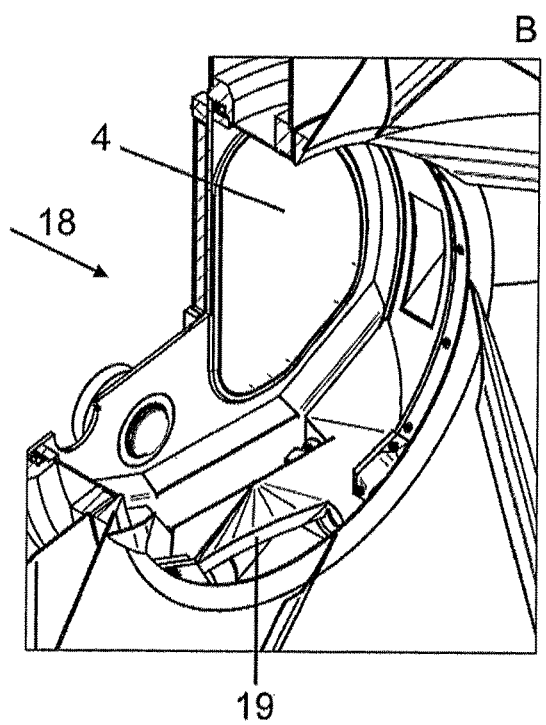
FIG. 8 shows the detail B of the perspective view of the outlet of the inventive drum coater with open cover.

FIGS. 7 and 8 respectively show the detail B of the perspective view of the outlet 18 of the inventive drum coater 1 with closed and open cover 19. In the open state, the cover 19 pivots downward and thereby unblocks the outlet 18 for the bulk-like material in the unloading mode of the drum 2 of the drum coater 1. In contrast, the cover 19 tightly seals the outlet 18 as soon as the drum coater 1 is in the mixing mode.

Figure 9:
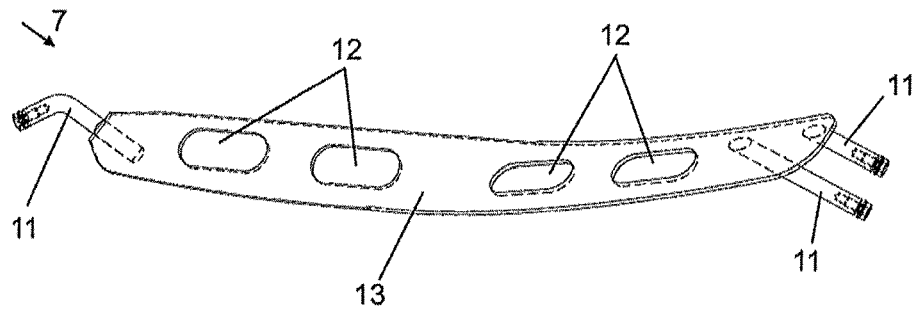
FIG. 9 shows a perspective view of an embodiment of the inventive mixing tool with concealed edges.
Figure 10:
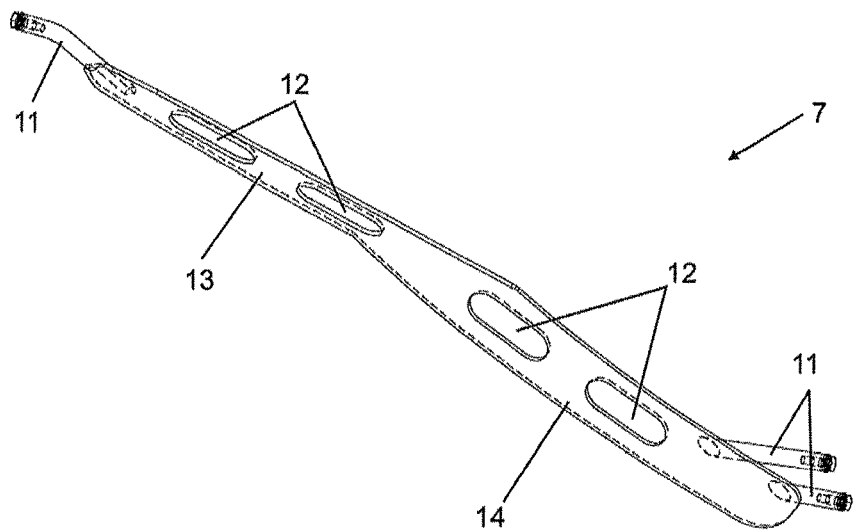
FIG. 10 shows a perspective view of an embodiment of the inventive mixing tool with concealed edges.
Figure 11:
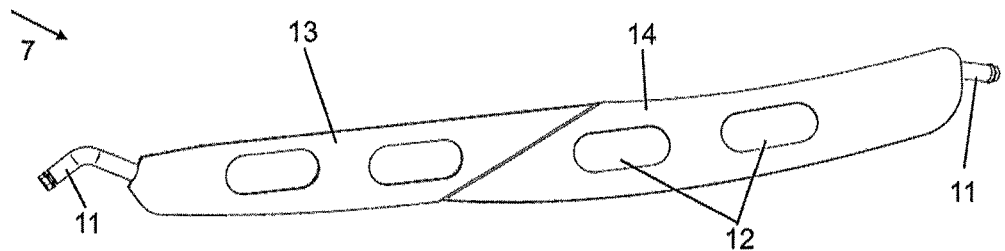
FIG. 11 shows a perspective view of an embodiment of the inventive mixing tool.

FIGS. 9, 10 and 11 respectively show a perspective view of an embodiment of the inventive mixing tool 7. In FIG. 9, the mixing tool 7 has a single mixing surface 13. In contrast, the mixing tools 7 illustrated in FIGS. 10 and 11 have two mixing surfaces 13 and 14. At least two openings 12 are arranged in the mixing surfaces 13, 14. In FIGS. 10 and 11, the two mixing surfaces 13, 14 are arranged angular to one another such that their pitch in the drum 2 differs from a first mixing tool 6. In this way, enhanced blending and/or homogenizing of the bulk material is achieved on the one hand and the mechanical stress exerted upon the bulk-like material by the mixing tool 7 is reduced on the other hand. In contrast, the mixing surface 13 in FIG. 9 is merely curved.

All described characteristic features may be essential to the invention individually, as well as in any combination.

Although only a few embodiments of the present invention have been shown and described, it is to be understood that many changes and modifications may be made thereunto without departing from the spirit and scope of the invention.

What is claimed is:

1. A drum coater for applying a surface layer on bulk-like materials, comprising
    a rotatably mounted drum for accommodating bulk-like materials,
    an inlet opening and an outlet opening,
    at least one spray nozzle for applying the surface material on the bulk-like materials,
    a drying device for a drum interior,
    at least one first mixing tool that is arranged in the drum and protrudes into the drum interior, and
    at least one second mixing tool that is arranged in the drum, wherein the at least one second mixing tool is arranged radially offset to the at least one first mixing tool and has at least one mixing surface, wherein the at least one first mixing tool partially overlaps the at least one second mixing tool and the at least one first mixing tool being without any openings,
    wherein
    the first mixing tool is at least partially arranged on the inner surface of the drum and
    the at least one second mixing tool arranged in the drum has at least one opening on the at least one mixing surface the at least one second mixing tool having a greater width than the at least one first mixing tool and together the mixing tools blending and homogenizing the bulk-like materials with sprayed surface material.

2. The drum coater according to claim 1, wherein the at least one second mixing tool transports the bulk-like materials in the same direction as the at least one first mixing tool.

3. The drum coater according to claim 1, wherein the at least one first mixing tool is arranged in the drum angular relative to a longitudinal drum axis.

4. The drum coater according to claim 1, wherein a pitch of the at least one second mixing tool is shallower than a pitch of the at least one first mixing tool.

5. The drum coater according to claim 1, wherein the at least one second mixing tool is detachably arranged in the drum of the drum coater.

6. The drum coater according to claim 1, wherein the drum has at least one driving element in the region of the outlet opening.

7. The drum coater according to claim 1, wherein the drum coater has an outlet for the bulk-like material.

8. The drum coater according to claim 7, wherein the outlet is closed during a rotation of the drum in a mixing mode.

9. The drum coater according to claim 1, wherein the at least one second mixing tool has a first mixing surface and a second mixing surface, and wherein the first mixing surface is angled relative to the second mixing surface.

10. A drum coater for applying a surface layer on bulk-layer materials, comprising:
    A rotatably mounted drum for accommodating bulk-like materials,
    An inlet opening and an outlet opening,
    at least one spray nozzle for applying the surface material on the bulk-like materials,
    a drying device for a drum interior,
    at least one first mixing tool that is arranged in the drum and protrudes into the drum interior, and
    at least one second mixing tool that is arranged in the drum, wherein the at least one second mixing tool is arranged radially offset to the at least one first mixing tool and has at least one mixing surface, wherein the at least one first mixing tool partially overlaps the at least one second mixing tool and the at least one first mixing tool being without any openings,
    wherein the first mixing tool is at least partially arranged on the inner surface of the drum and the at least one second mixing tool arranged in the drum has at least one opening on the at least one mixing surface and the at least one second mixing tool transports the bulk-like materials in the same direction as the at least one first mixing tool, and together the mixing tools blending and homogenizing the bulk-like materials with sprayed surface material.

11. The drum coater according to claim 10, wherein the at least one first mixing tool is arranged in the drum angular relative to a longitudinal drum axis.

12. The drum coater according to claim 10, wherein a pitch of the at least one second mixing tool is shallower than a pitch of the at least one first mixing tool.

13. The drum coater according to claim 10, wherein the at least one second mixing tool is detachably arranged in the drum of the drum coater.

14. The drum coater according to claim 10, wherein the drum has at least one driving element in the region of the outlet opening.

15. The drum coater according to claim 10, wherein the drum coater has an outlet for the bulk-like materials.

16. The drum coater according to claim 15, wherein the outlet is closed during a rotation of the drum in a mixing mode.

17. The drum coater according to claim 10, wherein the at least one second mixing tool has a first mixing surface and a second mixing surface, and wherein the first mixing surface is angled relative to the second mixing surface.

* * * * *